May 30, 1933. J. L. GONARD 1,911,686
DEVICE FOR PREVENTING RETROGRADE MOVEMENT OF A VEHICLE
Filed May 12, 1932 3 Sheets-Sheet 1
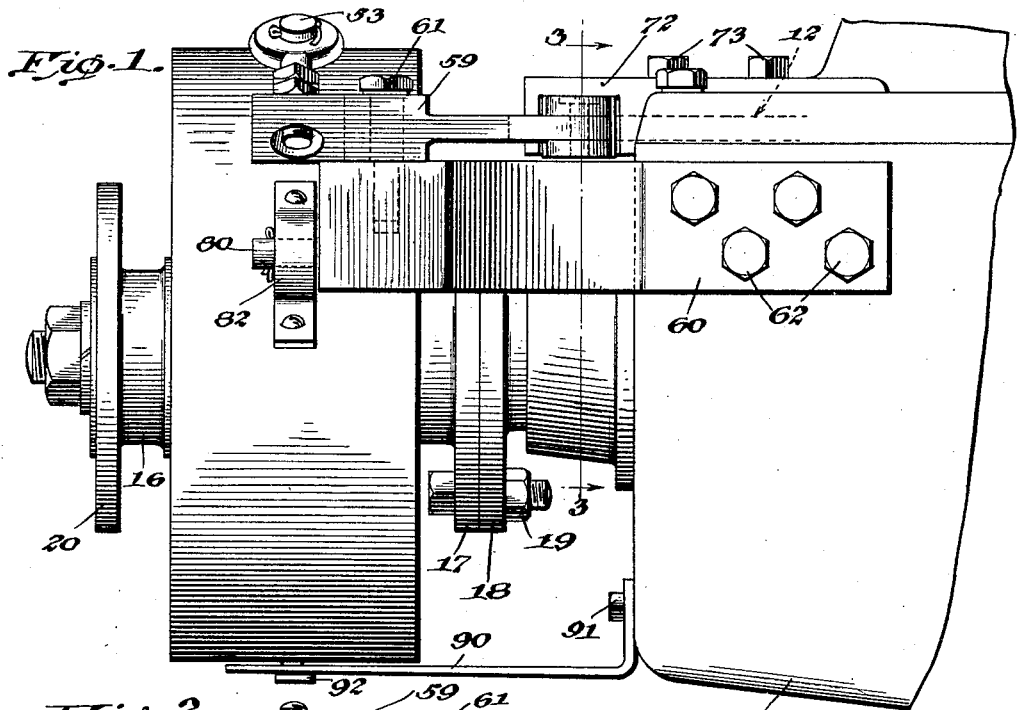
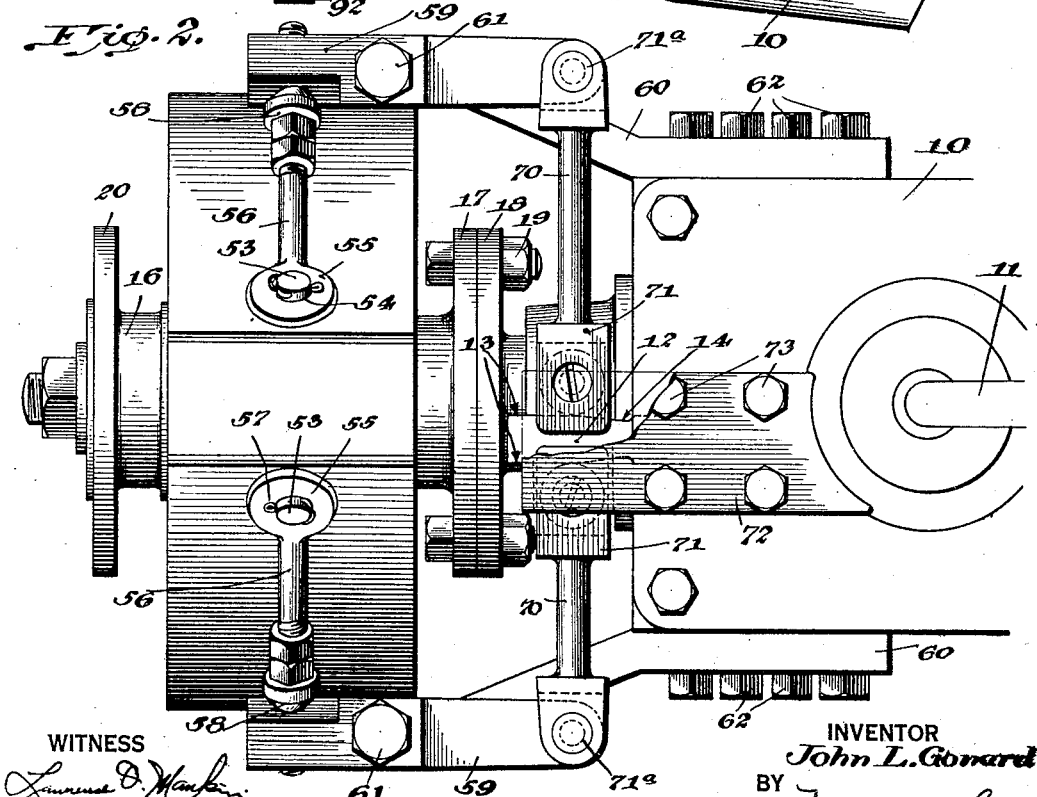
INVENTOR
John L. Gonard
BY
ATTORNEY

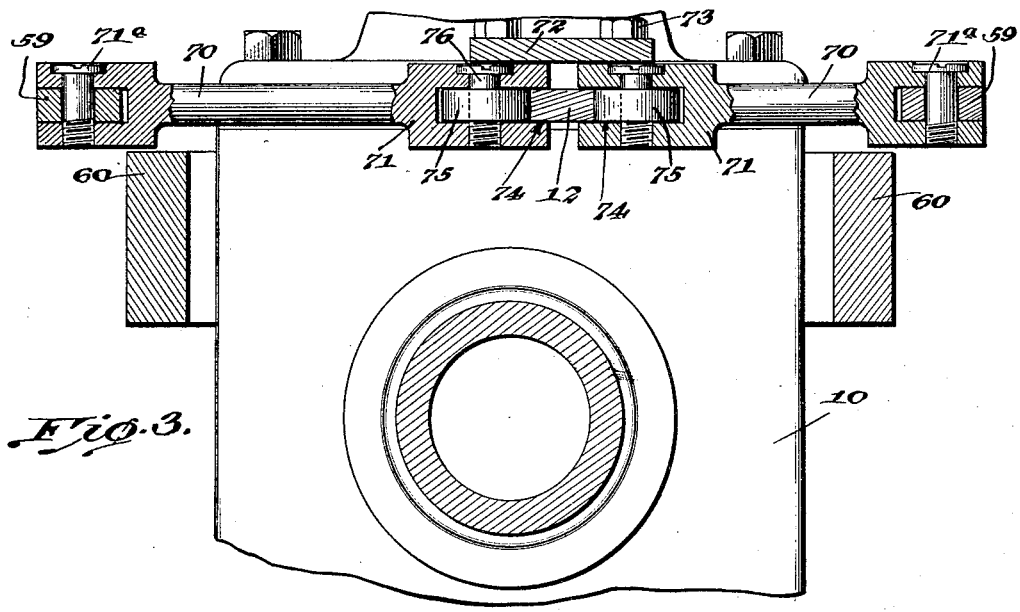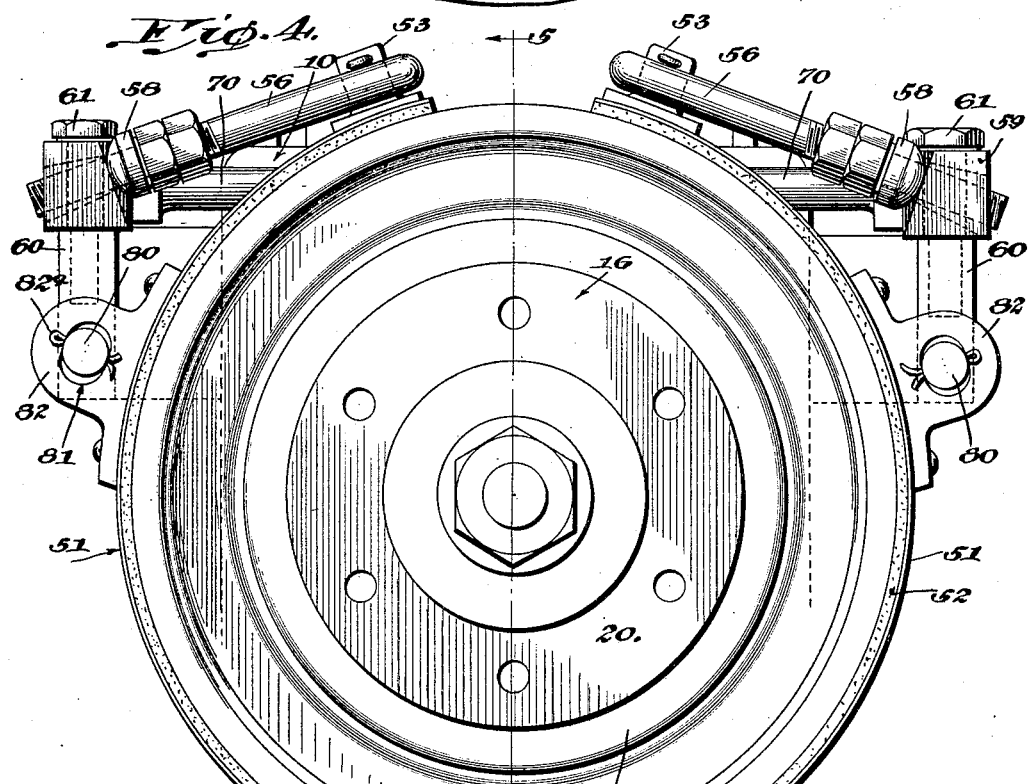

May 30, 1933.   J. L. GONARD   1,911,686
DEVICE FOR PREVENTING RETROGRADE MOVEMENT OF A VEHICLE
Filed May 12, 1932   3 Sheets-Sheet 3
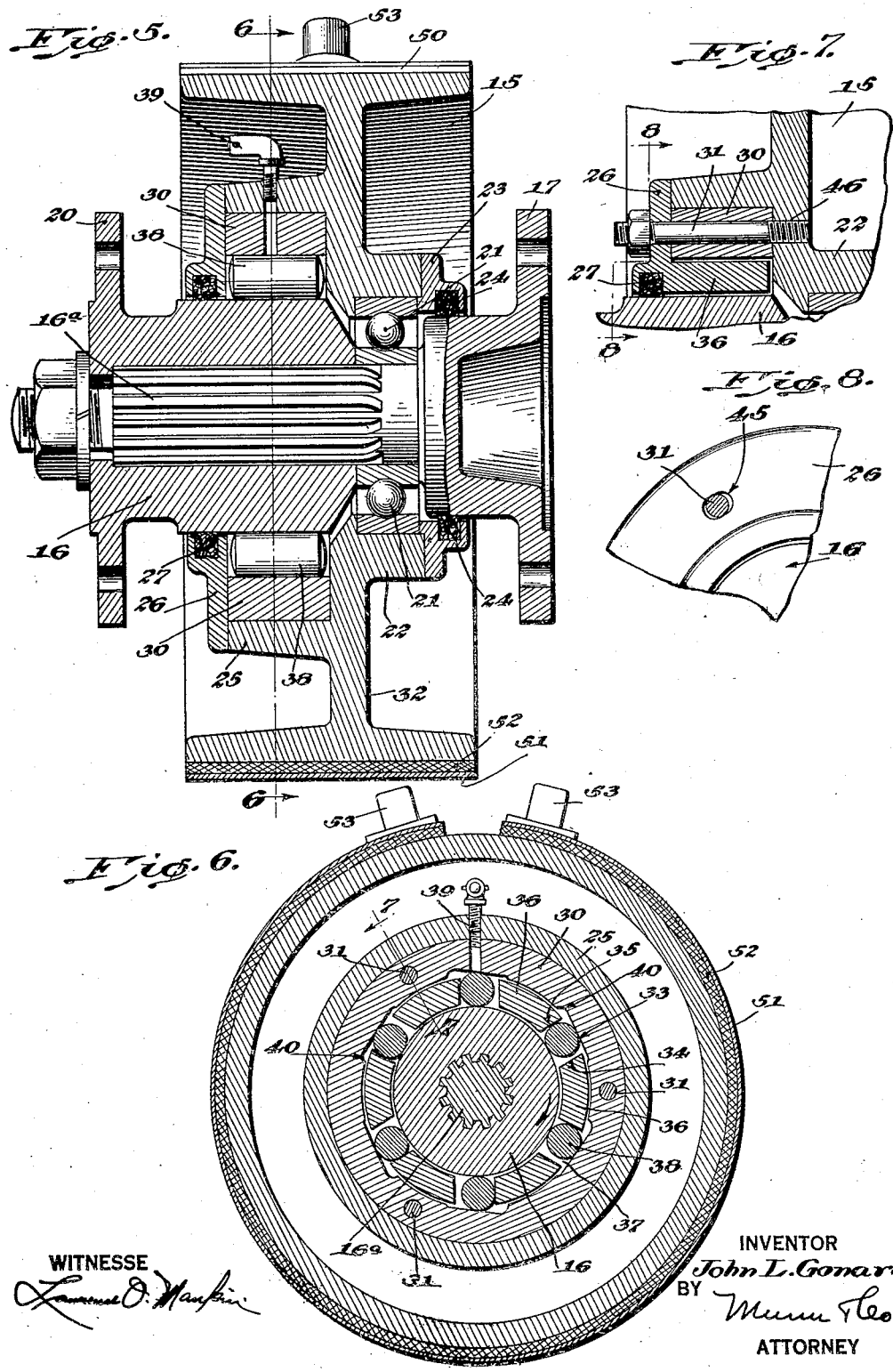
INVENTOR
John L. Gonard
BY
ATTORNEY Patented May 30, 1933

1,911,686

UNITED STATES PATENT OFFICE

JOHN L. GONARD, OF ENGLEWOOD CLIFFS, NEW JERSEY

DEVICE FOR PREVENTING RETROGRADE MOVEMENT OF A VEHICLE

Application filed May 12, 1932. Serial No. 610,939.

This invention relates to a device for preventing retrograde movement of a vehicle.

An object of the invention is the provision of a device for preventing retrograde movement of a vehicle when said vehicle is located on an inclined roadbed and when the transmission has been moved to either neutral or one of the forward speeds, means being employed for releasing a one-way braking mechanism when the gear-shifting elements have been moved to reverse position so that the vehicle may be moved rearwardly.

Another object of the invention is the provision of a device for preventing retrograde movement of the vehicle when either the neutral or any of the forward speeds of the transmission are in position, the device including a drum normally held against rotation by means of a brake band which is retained in an operative position on the drum by an extension of the shift element which controls the reverse speed, the extension having means which will permit release of the brake band and likewise the drum to permit the drum to be revolved, the drum being connected to the driven shaft extending from the transmission by a one-way clutch which will permit the shaft to be revolved independently of the drum but which will cause the drum and shaft to be locked together when the shaft tends to operate in the opposite direction.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a side view of an auxiliary attachment for a transmission to prevent retrograde movement of a vehicle, Figure 2 is a plan view of the device shown in Figure 1, Figure 3 is a transverse vertical section taken along the line 3—3 of Figure 1, Figure 4 is a rear end view of the device, Figure 5 is a longitudinal vertical section taken along the line 5—5 of Figure 4, Figure 6 is a transverse vertical section taken along the line 6—6 of Figure 5, Figure 7 is a section taken along the line 7—7 of Figure 6, and Figure 8 is a fragmentary vertical section taken along the line 8—8 of Figure 7.

Referring more particularly to the drawings, 10 designates a transmission of any well known type having a shifter rod 11 projecting outwardly therefrom. The transmission elements are not shown but a projection in the shape of a flat rod 12 extends from the transmission 10 and is connected at its inner end with a shifting element (not shown), which controls the low speed and the reverse so that if this element is shifted for controlling said speeds, the projection 12 will also be shifted. The extension or projection 12 has its side edges straight, as shown at 13, except for the portion 14 which is cut out for a purpose which will be presently explained.

A drum 15 is located rearwardly of the transmission 10 and is mounted concentrically on a sleeve 16. A shaft 16ª extends axially of the sleeve 16 and is connected to said sleeve. This shaft is connected by means of a disc 17 with a disc 18 through the bolts 19. The disc 18 is connected with the driven shaft which normally projects from the transmission housing 10 and which revolves the drive shaft of the vehicle. In this case, however, a disc 20, located rearwardly of the drum 15 is connected with a similar disc of the drive shaft of the vehicle. A disc 20 is formed integrally with the sleeve 16.

A bearing 21 mounted in a boss 22 forming the hub of the drum 15 embraces the shaft 16ª. A plate 23 having a packing 24 is secured to the hub 22 in any approved manner.

An annular flange 25 projects in an opposite direction from the hub 22 and houses a one-way clutching device. A plate 26 having a packing 27 embraces the sleeve 16 and forms a cover plate for the annular flange 25.

A ring 30 fits neatly within the flange 25 and is secured by means of pins 31 to the centrally disposed web 32 of the drum 15. It will be noted that the inner face of the ring 30 is provided with spaced cut-out portions 33 and the outer walls of these cut-out portions form with the edges 34 and 35 of fingers 36, pockets 37 to receive rollers 38 which rest upon the outer face of the sleeve 16. A conduit 39 provides means for supplying lubricant to the pockets 37. It will be noted that the outer walls 33 of the pockets 37 are inclined at a slight angle to tangents which would be normally drawn through the ends of radii passing from the center of the shaft 16$^a$ through the outermost points of the rollers 38. In other words, the fingers 36 maintain the rollers 38 in such a position that they will be jammed between the inclined walls 33 of the pockets 37 and the outer face of the sleeve 16 when the shaft tends to rotate in the direction indicated by the arrow in Fig. 6. A portion 40 of walls 33 is inclined sufficiently outwardly from the surface of the sleeve 16 to prevent the rollers 38 from being jammed between the portions 40 and the walls 33 and the outer face of the sleeve 16. In other words, the rollers 38 will lock the shaft 16$^a$ to the drum 15 when said shaft tends to rotate in the direction of the arrow in Fig. 6. On the other hand, when the shaft is revolved in the opposite direction the rollers 38 will not act as a clutch so that the shaft may be revolved. It is in this direction of rotation that the vehicle is propelled forwardly by such rotation of the shaft 16$^a$. If the vehicle, on the other hand, would tend to roll backwardly down a hill and revolve the shaft in the direction indicated in Fig. 6, the rollers would be jammed between the outer walls 33 of the pockets 37 and the outer face of the sleeve 16 and thus prevent retrograde movement of the vehicle, provided, however, that the drum 15 is held against rotation.

From an inspection of Figs. 5 to 8, inclusive, it will be seen that the fingers 36 are formed integrally with the cover plate 26 and the bolts 31 pass through elongated slots 45 formed in the cover plate 26 so that the cover plate may be revolved slightly and its movement of rotation is limited by the length of the opening 45. In other words, the cover plate 26 may be adjusted for varying the position of the fingers 36 with respect to the portion 40 of greater depth of the walls 33 of the pockets 37 so that the rollers will be in a position where they will be jammed between the walls 33 and the sleeve 16 when the shaft 16$^a$ tends to rotate in the direction of the arrow in Fig. 6. It will be noted that the bolts 31 pass through the cover plate 26, the ring 30, and are threaded at 46 into the web 32 of the drum 15.

A brake band, generally indicated by the numeral 50, embraces the outer surface of the drum 15 and is formed of a metal band 51 and a liner 52. Lugs 53 project outwardly from the ends of the brake band and are adapted to receive an eye 54 of a disc 55 formed at one end of a rod 56. It will be noted that this construction is identical upon opposite sides of the upper free ends of the brake band. A cotter pin 57 maintains the disc in position on the pin or lug 53.

The rod 56 is connected at 58 with a lever 59 pivoted upon a bracket 60 by means of a bolt 61, the bracket being secured by means of bolts 62 to the transmission 10.

From each free end of a lever 59 extends a rod 70 which is pivoted at its outer end, as shown at 71$^a$, to the free end of the lever 59. The rods 70 will be in alignment and extend transversely of the transmission and forwardly of said transmission.

The inner ends of the rods are provided with cross heads 71 which are slidably mounted in a guide block 72 which is secured at 73 to the top of the transmission casing 10.

Each of the cross heads at their inner adjacent ends, as shown more particularly in Fig. 3, is provided with a slot 74 to receive the projection or extension 12 which is in engagement with rollers 75 rotatably mounted on pins 76 carried by the cross heads. The rollers 75 are located at the inner ends of the slots 74 and the cross heads 71 are guided in their horizontal movement through the guide block 72 and the flat bar 12 which is a projection of one of the shifting elements of the transmission.

Pins 80 project rearwardly from the bracket 60 and are adapted to be received within elongated slots 81 formed in blocks 82 secured to the metal band 51 of the brake band 50. A cotter pin 82$^a$ passes through a perforation in the pin 80 and maintains the block 82 on the pin.

The operation of my device is as follows: When the shifting rod 11 is moved to a position to produce a forward speed or when the shifting rod is moved to neutral, the straight edges 13 of the projection 12 are in engagement with the rollers 75 carried by the cross heads 71. In this position the rods 70 are moved outwardly while the outer ends of the levers 59 are moved inwardly, thereby forcing the rods 56 towards each other and causing the brake band 50 to tightly grip the drum 15. Since the drum 15 is held against movement by the brake band, if the vehicle were on an incline and would tend to roll backwardly, the one-way clutching element, shown more particularly in Figs. 5 and 6, through the rollers 38, will lock the sleeve 16 to the drum 15 and prevent rotation of the shaft 16ª in one direction, and thus the vehicle will be prevented from rolling backwardly down the hill.

If, on the other hand, it be desired to move the transmission rearwardly at any time, it is only necessary to move the shifter rod 11 to the normal reverse position when the notches or cut-out portions 14 of the projection 12 will align with the rollers 75, thereby permitting the cross heads 71 to be moved towards each other so that the rods 70 will move towards each other and likewise the connected ends of the levers 59. The opposite ends of said levers, however, will be moved outwardly, thereby releasing the brake band 50 from the drum 15 and permit the drum to be revolved with the sleeve 16 and the shaft 16ª.

The elongated slots 81 in the blocks 82 in connection with the pins 80 retain the brake band in proper position around the drum 15.

An arm 90, secured at 91 to the rear of the transmission 10, is provided with a pin 92 connected to the bottom portion of the brake band 50 for maintaining the brake band in position with respect to the outer surface of the drum 15.

I claim:

1. A device for preventing retrograde movement of a power-driven vehicle comprising a drum, a brake band for normally holding the drum against rotation, a driven shaft, a one-way clutching means in the drum co-operatively associated with the drum and shaft for preventing rotation of the shaft in one direction, a gear shifting element associated with the reverse gearing of the transmission of the vehicle, levers for operating the brake band and means connected with the shifting element and acting on the free end of said levers for causing said levers to release for releasing the brake band to permit the vehicle to be moved backwards.

2. A device for preventing retrograde movement of a power-driven vehicle comprising a drum, a brake band for normally holding the drum against rotation, a driven shaft, a one-way clutching means in the drum co-operatively associated with the drum and shaft for preventing rotation of the shaft in one direction, a lever connected with each end of the brake band, the free ends of the levers being spaced apart, a gear shifting element associated with the reverse gearing of the transmission of the vehicle, a cam element secured to said element located between the upper ends of said levers for maintaining the brake band tight on the drum, said cam element having means to release the brake band when the gear-shifting element has been moved to reverse position.

3. A device for preventing retrograde movement of a power-driven vehicle comprising a drum, a brake band for normally holding the drum against rotation, a lever pivotally mounted intermediate the ends thereof adjacent each end of the brake band, means connecting an end of the lever with an end of the brake band, a pair of slidably mounted bars, the other end of each lever being pivotally connected with one of the bars, the free ends of the bars being adjacent each other, a projection connected with a shifting element that controls the reverse gearing of the transmission and disposed between the adjacent ends of the bars for maintaining the ends of said bars in spaced relation so that the levers will be rocked to such a position that the brake band will be held taut upon the drum, a drive shaft of the vehicle passing through the drum, a one-way clutching element in the drum engaging the shaft to prevent rotation of the shaft in one direction when the drum is held against rotation.

4. A device for preventing retrograde movement of a power-driven vehicle including a transmission and comprising means capable of being rotated, means for normally holding the rotatable means against rotation, a driven shaft for propelling the vehicle, a one-way clutching element between the shaft and the rotatable means to permit rotation of the shaft during forward speeds of the vehicle and during a neutral condition of the transmission, said one-way clutch locking the shaft to the first-mentioned means when the vehicle tends to rotate the shaft by a retrograde movement of the vehicle, and means connected with a shifting element that controls the reverse speed of the vehicle, levers connected with the holding means for operating said means, slidable means connected with the levers and actuated by the means connected with the shifting element for operating the slidable means and the levers to release the holding means when the shifting element has been moved to a reverse position.

JOHN L. GONARD.